US010060300B2

(12) United States Patent
Bastnagel et al.

(10) Patent No.: US 10,060,300 B2
(45) Date of Patent: Aug. 28, 2018

(54) SECTIONED GAS TURBINE ENGINE DRIVEN BY SCO2 CYCLE

(71) Applicants: Rolls-Royce Corporation, Indianapolis, IN (US); Rolls-Royce North American Technologies, Inc., Indianapolis, IN (US)

(72) Inventors: Thomas E. Bastnagel, Danville, IN (US); Igor Vaisman, Carmel, IN (US); Donald W. Burns, Avon, IN (US); Michael J. Armstrong, Avon (IN)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 101 days.

(21) Appl. No.: 15/214,423

(22) Filed: Jul. 19, 2016

(65) Prior Publication Data
US 2017/0022844 A1  Jan. 26, 2017

Related U.S. Application Data

(60) Provisional application No. 62/194,614, filed on Jul. 20, 2015.

(51) Int. Cl.
*F01K 23/08* (2006.01)
*F01K 25/10* (2006.01)
(Continued)

(52) U.S. Cl.
CPC ................ *F01K 23/08* (2013.01); *F01K 7/32* (2013.01); *F01K 25/103* (2013.01); *F02C 1/005* (2013.01);
(Continued)

(58) Field of Classification Search
CPC .......... F01K 23/08; F01K 25/103; F01K 7/32; F02C 3/04; F02C 1/005; F28F 27/02;
(Continued)

(56) References Cited

U.S. PATENT DOCUMENTS 2,404,938 A * 7/1946 Armacost ............. F01K 23/103
122/DIG. 1
3,971,211 A 7/1976 Wethe et al.
(Continued)

FOREIGN PATENT DOCUMENTS

GB    2499376 A    8/2013

OTHER PUBLICATIONS

Extended European Search Report dated Dec. 14, 2016 for EP Pat App No. 16179930.9.

*Primary Examiner* — Hoang Nguyen
(74) *Attorney, Agent, or Firm* — Fishman Stewart PLLC

(57) ABSTRACT

An apparatus, system, and method for a gas turbine engine may include a sectioned heat exchanger. A heat exchanger may include an inlet manifold configured to receive a working fluid. A plurality of circuits including at least first and second circuits configured to transfer heat with respect to the working fluid. Each of the circuits may have a circuit inlet valve, a circuit heat exchange channel, and a circuit outlet valve. The heat exchanger may further include an outlet manifold configured to pass the working fluid to an outlet. The heat exchanger may include a first sensor configured to measure of first parameter of the first circuit and a second sensor configured to measure a second parameter of at least one of the outlet and the second circuit. A controller may be configured to selectively isolate at least one of the plurality of circuits based on a pressure difference between the first and second parameters.

20 Claims, 3 Drawing Sheets

(51) Int. Cl.
  *F02C 3/04* (2006.01)
  *F28F 27/00* (2006.01)
  *F02C 1/00* (2006.01)
  *F28F 27/02* (2006.01)
  *F01K 7/32* (2006.01)

(52) U.S. Cl.
  CPC ............... *F02C 3/04* (2013.01); *F28F 27/00* (2013.01); *F28F 27/02* (2013.01); *F05D 2210/12* (2013.01); *F05D 2210/20* (2013.01); *F05D 2220/32* (2013.01); *F05D 2260/213* (2013.01); *F05D 2270/09* (2013.01); *F28F 2265/16* (2013.01); *Y02T 50/675* (2013.01)

(58) Field of Classification Search
  CPC ..... F28F 27/00; F28F 2265/16; Y02T 50/675; F05D 2210/12; F05D 2210/20; F05D 2220/32; F05D 2270/09; F05D 2260/213
  USPC .................................. 60/650, 682–684, 39.6
  See application file for complete search history.

(56) References Cited

U.S. PATENT DOCUMENTS

| | | | |
|---|---|---|---|
| 4,083,398 A * | 4/1978 | Fallon, Jr. | F23L 15/045 122/510 |
| 4,377,072 A * | 3/1983 | Campbell, Jr. | F02C 3/205 165/104.16 |
| 6,216,776 B1 | 4/2001 | Kobayashi et al. | |
| 8,132,412 B2 | 3/2012 | Bennett | |
| 8,281,593 B2 | 10/2012 | Held et al. | |
| 8,397,506 B1 | 3/2013 | Wright et al. | |
| 8,464,534 B1 | 6/2013 | Riemer | |
| 8,479,516 B2 | 7/2013 | Carter | |
| 8,490,397 B2 | 7/2013 | Lehar | |
| 8,596,075 B2 | 12/2013 | Allam et al. | |
| 8,613,195 B2 | 12/2013 | Held et al. | |
| 8,616,001 B2 | 12/2013 | Held et al. | |
| 8,616,323 B1 | 12/2013 | Gurin | |
| 8,752,382 B2 | 6/2014 | Lehar | |
| 8,794,002 B2 | 8/2014 | Held et al. | |
| 8,813,497 B2 | 8/2014 | Hart et al. | |
| 8,814,981 B2 | 8/2014 | Stallmann | |
| 8,820,083 B2 | 9/2014 | Davidson et al. | |
| 8,857,186 B2 | 10/2014 | Held | |
| 8,869,531 B2 | 10/2014 | Held | |
| 8,887,503 B2 | 11/2014 | Sonwane et al. | |
| 8,959,887 B2 | 2/2015 | Allam et al. | |
| 8,966,901 B2 | 3/2015 | Held et al. | |
| 2012/0067055 A1 | 3/2012 | Held | |
| 2012/0131920 A1 | 5/2012 | Held et al. | |
| 2012/0140416 A1 * | 6/2012 | Price | F28D 9/0093 361/701 |
| 2012/0186219 A1 | 7/2012 | Gurin | |
| 2013/0014511 A1 | 1/2013 | Gurin | |
| 2013/0104547 A1 | 5/2013 | Leduc | |
| 2013/0152576 A1 | 6/2013 | Mavuri et al. | |
| 2013/0180259 A1 | 7/2013 | Stapp | |
| 2013/0180681 A1 * | 7/2013 | Magee | F28F 9/013 165/11.1 |
| 2013/0239542 A1 | 9/2013 | Dasgupta et al. | |
| 2014/0023478 A1 | 1/2014 | Maeda et al. | |
| 2014/0060002 A1 | 3/2014 | Sonwane et al. | |
| 2014/0084595 A1 | 3/2014 | Davidson et al. | |
| 2014/0088773 A1 | 3/2014 | Davidson et al. | |
| 2014/0096524 A1 | 4/2014 | Held et al. | |
| 2014/0103661 A1 | 4/2014 | Kacludis et al. | |
| 2014/0119881 A1 | 5/2014 | Kalra et al. | |
| 2014/0208750 A1 | 7/2014 | Vermeersch et al. | |
| 2014/0238065 A1 * | 8/2014 | Bonnin | H05K 7/20218 62/259.2 |
| 2015/0033737 A1 | 2/2015 | Mitri et al. | |

* cited by examiner

SECTIONED GAS TURBINE ENGINE DRIVEN BY SCO2 CYCLE

CROSS-REFERENCE TO RELATED APPLICATIONS

This application is a non-provisional application claiming priority to U.S. Provisional Application No. 62/194,614 filed Jul. 20, 2015, which is hereby incorporated by reference in its entirety.

FIELD OF TECHNOLOGY

An improved apparatus and method of operating a gas turbine engine includes providing power to a shaft of the gas turbine engine using carbon dioxide ($CO_2$) operated in super-critical cycle ($sCO_2$ cycle). Further, a sectioned heat exchanger and associated methods are disclosed.

BACKGROUND

It has become increasingly desirable to reduce the size of power-producing or thrust-producing devices such as gas turbine engines. Gas turbine engines typically include one or more shafts that include compressors, bypass fans, and turbines. Typically, air is forced into the engine and passed into a compressor. The compressed air is passed to a combustor, and at high temperature and pressure the combustion products are passed into a turbine. The turbine provides power to the shaft, which in turn provides the power to the compressor and bypass fan or gearbox. Thrust is thereby produced from the air that passes from the bypass fan, as well as from the expended in the turbine combustion products.

However, air can be thermodynamically inefficient, especially during cruise operation of the engine (such as in an aircraft). Air that enters the engine is of low pressure, therefore low density. In order to reach the needed pressure and temperature at the combustor exit, the air is compressed to very high pressure ratios and heated up to very high temperatures in the combustors. In order to provide adequate mass flow rate, significant volume flow rate of the low density air is pumped through high pressure ratio consuming significant amount of power. As a result, the engines are made of large and heavy components, consume large amounts of fuel, and may include significant operational and maintenance expenses to cope with high combustion temperatures.

Some gas turbine engines include multiple stages and shafts to further improve thermodynamic efficiency. That is, some systems may include various compression stages that increase the pressure in each stage, providing very high pressure ratios that is passed to combustion, and expansion of the combustion products may also be through multiple stages, as well. For instance, a gas turbine may have Low Pressure (LP) and High Pressure (HP) shafts that correspond with respective LP and HP compressors and turbines, further improving the thermodynamic efficiency over a single stage engine. Or, such systems may include multiple compression and expansion stages.

One traditional option includes using an intercooler, to further improve thermodynamic efficiency by cooling the compressed air between compression stages (i.e., between LP and HP compressors). In fact, many gas turbine engines have been designed and implemented to improve thermodynamic efficiency.

However, these traditional gas turbine engines use air as an incoming working fluid that is used in the combustion process. As such, although traditional gas engines have made great strides in improving thermodynamic efficiency, such systems face a fundamental challenge of low density incoming air that is compressed in very high pressure ratios and heated up to very high temperatures. This fundamental challenge results in gas turbine engines that are generally quite large, to accommodate the large compression ratios. Such large components result in overall aircraft efficiencies because of the large amounts of mass that are used to build the engines, to meet the material needs for such large pressure ratios and high combustion temperatures.

To reduce component size and complexity, some power-producing or thrust-producing devices include a super-critical carbon dioxide ($s-CO_2$) system that provides significantly improved efficiencies compared to a Brayton cycle and other air-based systems by operating in a super-critical region (operating at a temperature and pressure that exceed the critical point). Close to the critical point and in the super-critical region, the combination of thermodynamic and transport properties of $CO_2$ provide a tremendous opportunity for high power energy extraction and in a small footprint relative to, for instance, an air-based thermodynamic system (such as a Brayton cycle).

Gas turbine engines have high reliability requirements. If a leak occurs in a gas turbine engine driven by supercritical $CO_2$ cycle and the CO2 charge is lost, the engine performance degradation may reach a critical level. Thus, it may be beneficial to section heat exchangers of the engine in order to provide ability to switch off leaking sections and improve the engine reliability.

As such, there is a need to improve reliability, thermodynamic efficiency, and reduce overall size and mass in gas turbine engines.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine is described herein, and various embodiments thereof. According to the disclosure, a gas turbine engine uses a s$CO_2$-based power source to provide power to the shaft, reducing the pressure ratio while providing adequate power and thrust for aircraft and other purposes.

Disclosed is a heat exchanger for use in gas turbine engine that is operable in a super-critical mode of the s$CO_2$ cycle. The s$CO_2$ gas turbine engine includes at least one sectioned heat exchanger having a plurality of circuits. Each circuit includes an inlet valve, an outlet valve, and a first or circuit sensor, e.g., a first pressure sensor. Further, the heat exchanger includes a second or common sensor at its outlet, e.g., a second pressure sensor. A controller is coupled to the heat exchanger and is configured to detect a leak associated with a working fluid such as a refrigerant.

For example, a first or circuit pressure of one of the circuits may be compared with a second pressure of the outlet or one or all of the other circuits. If a difference between the first pressure of the circuit is not aligned with the second pressure of the outlet or other circuits, or the pressure difference reaches a predefined threshold, then the circuit is determined by the controller to have a leak, and the controller closes inlet and outlet valves to isolate the circuit.

Further, embodiments for a gas turbine engine may include a sectioned heat exchanger. A heat exchanger may include an inlet manifold configured to receive a working fluid through an inlet. The heat exchanger may have a plurality of circuits including at least first and second circuits that may be configured to transfer heat with respect to the working fluid. Each of the circuits may have a circuit inlet valve, a circuit heat exchange channel, and a circuit outlet valve. The heat exchanger may further include an outlet manifold configured to pass the working fluid from the circuits to an outlet, which may be part of or connected to the outlet manifold. The heat exchanger may include a first sensor configured to measure a first parameter of the first circuit and a second sensor configured to measure a second parameter of the outlet or one or more second circuits. A controller may be configured to selectively isolate one or more first circuits based on a parameter difference between the first and second parameters. The one or more second circuits may include one, a portion of, or all of the remaining circuits.

Figure 1:
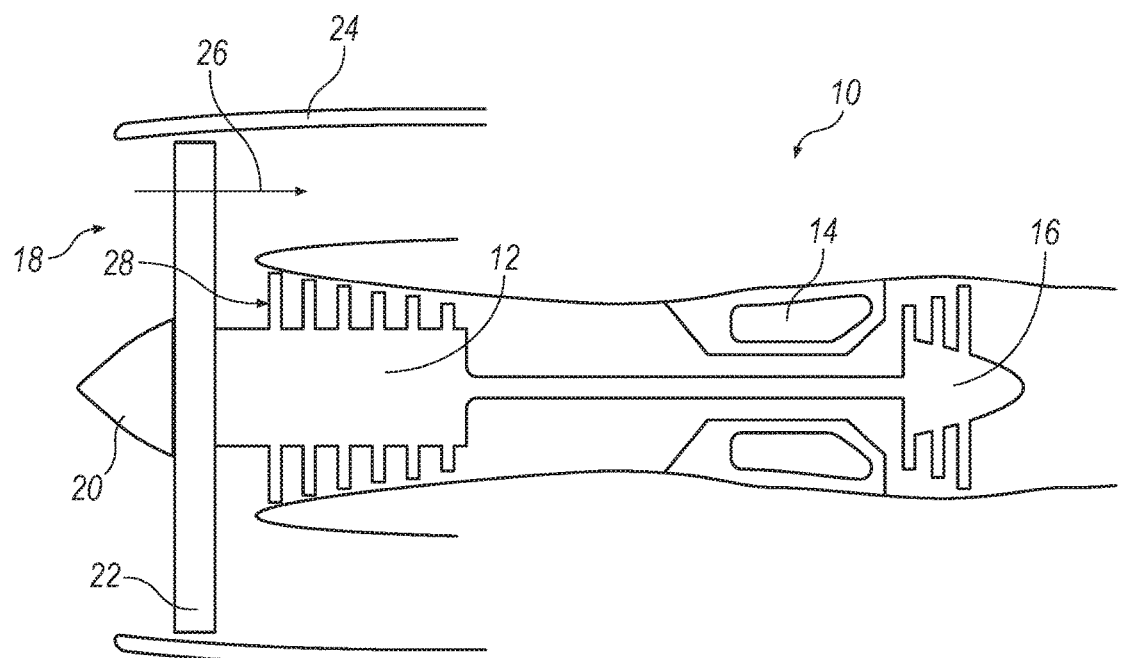
FIG. 1 is an illustration of a conventional gas turbine engine, for example, that may be utilized with a sectioned heat exchanger.

FIG. 1 illustrates a schematic diagram of a gas turbine machine 10 that is a primary mover or thrust source for an aircraft. The turbine machine 10 includes a primary compressor 12, a combustor 14 and a primary turbine assembly 16. A fan 18 includes a nosecone assembly 20, blade members 22 and a fan casing 24. The blade members 22 direct low pressure air to a bypass flow path 26 and to the compressor intake 28, which in turn provides airflow to compressor 12. The engine provides two major functions: propulsion and power generation used to rotate the compressors, turbines, and the bypass fan. The major function, propulsion, includes fairly low air pressures and temperatures, which are approximately equal to the pressures and temperatures exiting the gas turbine engine. However, the air pressure ratios and temperatures generated in the gas turbine engine are relatively very high. The high pressure ratios and temperatures are needed to provide the power generation function. In one traditional example, an engine has a pressure of 180 psia and a temperature of 1600° F. at the combustor exit and pressure of 25 psia and temperature of 1000° F. at the last turbine exit provided that the pressure at the engine inlet is 15 psia on the ground. This means that the propulsion requires pressure ratio of 25/15=1.67, when the total pressure ratio in the engine is 180/15=12 covers power for both propulsion and power generation devices. In some engines, the difference in pressure ratios and combustion temperatures may be even greater.

The propulsion and power generation functions may be considered split from one another and a power source is assumed present. Therefore, the engine design significantly simplifies as illustrated in FIG. 2.

Figure 2:
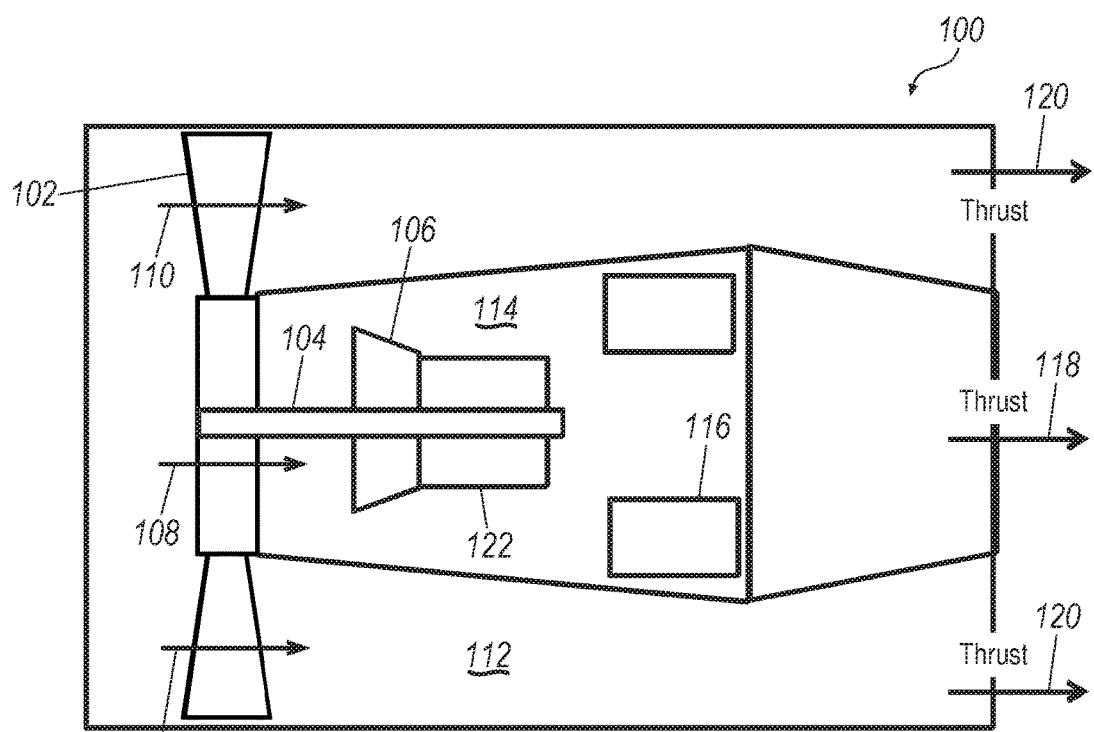
FIG. 2 is an illustration of a gas turbine engine with split propulsion and power generation functions which is an intermediate step to introduce a gas turbine engine, for example, driven by s-CO2 power generation cycle and utilized with a sectioned heat exchanger.

FIG. 2 is an illustration of a gas turbine engine which employs a power source 122. Engine 100 includes a fan 102 coupled to a shaft 104. A compressor 106 is coupled to shaft 104 and is positioned to receive air 108 that passes from fan 102 to compressor 106. Air 108 passes to region 114 and to a combustor 116 in which fuel is combusted with air 108. Fan 102 also causes bypass air 110 to pass to region 112, externally to region 114. That is, air 108 passes through compressor 106, to combustor 116 as pressurized air, and combustion products from combustor 116 cause a thrust 118. Thrust 120 is also provided to engine 100 by bypass air 110.

A power source 122 powers compressor 106 and bypass fan 102 via shaft 104 and the compressor and the fan produce thrust. Shaft 104 of engine 100 is separately powered by power source 122, avoiding the extraction of energy from the combustion products from combustor 116 via, for instance, a turbine as shown on FIG. 3. As such, the enthalpy stream from combustor 116 is available to generate thrust 118, without extraction first through a turbine as in a conventional gas turbine engine.

In one example, a gas turbine engine with such a power source needs pressure of 25 psia and temperature of 1000° F. at the combustor exit provided that the pressure at the engine inlet is approximately 15 psia. In this case the total pressure ratio in the engine is 25/15=1.67, which means that power requirements for the power source is substantially lower than the power requirements for some traditional engines, which includes a pressure ratio equal to 12 as mentioned above. Also, temperature exiting the combustor may be reduced, in one example, from 1600° F. to 1000° F.

Traditional engines include one or more turbines attached to one or more shafts, which extract enthalpy from the combustion products. Accordingly, compressors and turbines are relatively large, to accommodate the excessive temperatures and pressures in the very high pressure-ratio operation.

According to the disclosure, a s-CO2 power generation cycle implements functions of the power source. The closed circuit s-CO2 power generation system extracts power from a working fluid. The working fluid may include a refrigerant that is operable in a super-critical cycle, such as carbon dioxide.

Super-critical carbon dioxide (s-$CO_2$) systems provide significantly improved efficiencies compared to Brayton and other air-based systems by operating in a super-critical region having a temperature and pressure that exceed the critical point. That is, a phase-diagram of $CO_2$, as is commonly traditional, includes a "triple point" as the point that defines the temperature and pressure where solid, liquid, and vapor meet. Above the triple point the fluid can exist in liquid, vapor, or in a mixture of the both states. However, at higher temperature and pressure, a critical point is reached which defines a temperature and pressure where gas, liquid, and a super-critical region occur. The critical point is the top of the dome made up of the saturated liquid and saturated vapor lines. Above the critical point is the gaseous region.

A super-critical fluid occurs, as stated, at temperatures and pressures above the critical point, where distinct liquid and gas phases do not exist. Close to the critical point and in the super-critical region, small changes in pressure or temperature result in large changes in density, allowing many properties of the super-critical fluid to be fine-tuned, and providing a tremendous opportunity for high power energy extraction and in a small footprint relative to, for instance, an air-based thermodynamic system (such as a Brayton cycle).

Any fluid has a triple point, a critical point, saturated liquid and vapor lines, and a super-critical region. One in particular, carbon dioxide, is particularly attractive for such operation due to its critical temperature and pressure of approximately 31° C. and 73 atmospheres, respectively, as well as due to its lack of toxicity. Thus, s-$CO_2$-based systems may be operated having very dense super-critical properties, such as approximately 460 kg/m$^3$. The excellent combination of the thermodynamic properties of carbon dioxide may result in improved overall thermodynamic efficiency and therefore a tremendously reduced system size.

Due to the compact nature and high power density of power source 122 that is powered with a super-critical cycle, the overall size of engine 100 is significantly reduced as well. As such, thrust 118 obtained as a result of combustion in combustor 116 occurs at a low pressure and temperature when compared to a conventional gas turbine engine. Thrust 118, in combination with thrust 120 from bypass air 110, provides an overall thrust in an engine that is significantly reduced in size compared to a size of a conventional gas turbine engine. Such overall size reduction is due at least to the high power density available in power source 122, in combination with the significantly reduced pressure requirements in an engine that does not include turbines coupled to a shaft, such as shaft 104.

Thus, gas turbine engine 100 includes shaft 104 having compressor 106 coupled thereto. Combustor 116 is positioned to receive compressed air from compressor 106, and power source 122 is coupled to shaft 104. Power source 122 is powered by a working fluid (or a mixture of fluids) other than the compressed air, such as a solvent that may include, in one example, carbon dioxide as the working fluid. Various examples of engine 100 with power source 122 may be implemented, as will be further illustrated.

Figure 3:
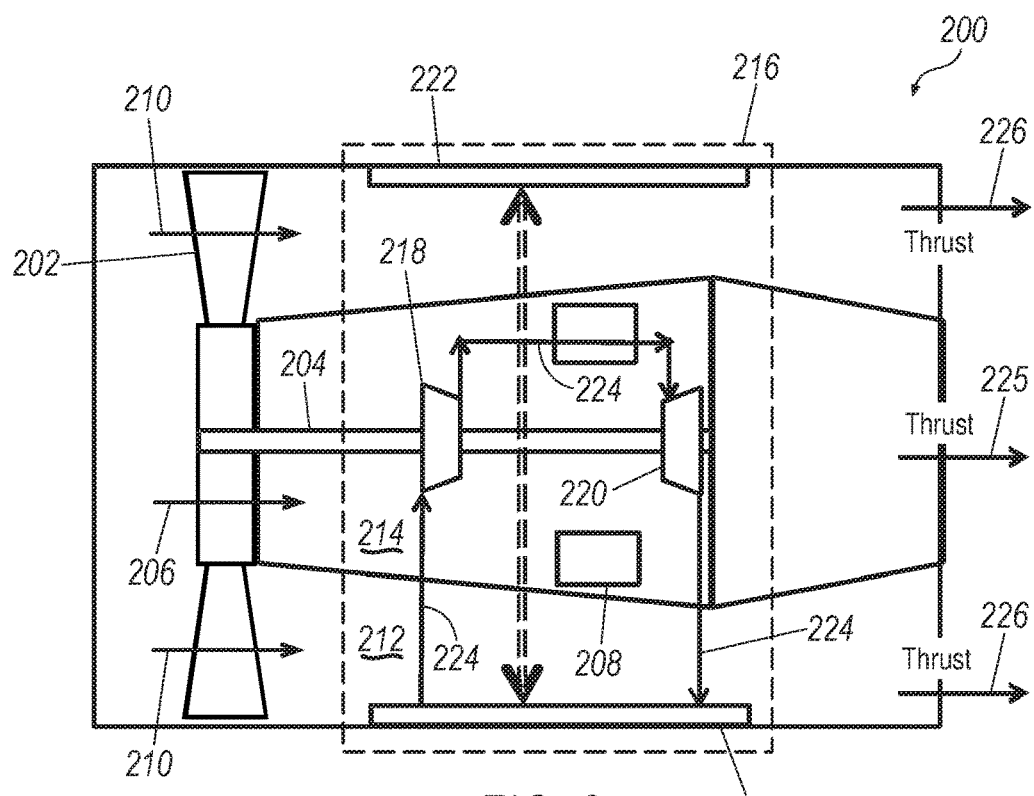
FIG. 3 is an illustration of a gas turbine engine in which a fan provides compressed air to a combustor, for example, driven by s-CO2 power generation cycle and utilized with a sectioned heat exchanger.

FIG. 3 is an illustration of a s-$CO_2$-based device or gas turbine engine 200 that includes a fan 202 coupled to a shaft 204. Engine 200 in this example does not include an air compressor per se, such as compressor 106 illustrated in FIG. 2, but instead fan 202 causes air 206 to pass into a combustor 208, while also causing bypass air 210 to pass externally 212 to a region 214 in which fuel is combusted with air 206. As such, air 206 is compressed to a degree and sufficient to cause air flow to combustor 208, and in this regard fan 206 may be considered itself to be a compressor.

Gas turbine engine 200 includes a power source 216, which includes a working fluid compressor 218 coupled to shaft 204. A working fluid turbine 220 is coupled to shaft 204, and a heat rejection heat exchanger 222 is positioned in thermal contact with bypass air 210 that passes through region 212. Lines 224 form a closed circuit that interconnect, such that a working fluid passes through heat rejection heat exchanger 222, to compressor 218, and through combustor 208. The working fluid passes from combustor 208 to turbine 220, where it returns to heat rejection heat exchanger 222. The working fluid, such as carbon dioxide, thus operates in super-critical mode by maintaining the temperature and pressure above the critical temperature and pressure.

Thus, in operation, power source 216 provides power to shaft 204 by receiving thermal power via the working fluid passing combustor 208, and imparting the power therefrom to the shaft via turbine 220 in which a pressure drop of the working fluid occurs. Heat is rejected from the working fluid in heat rejection heat exchanger 222, which is itself cooled with bypass air 210. Turbine 220 expands the working fluid while causing shaft 204 to rotate, which provides rotational power to fan 202 (producing air stream 206 and bypass air 210), while providing power to compressor 218 in which the working fluid is compressed, resulting in thrust 225 from combustor 208, as well as thrust 226 from bypass air 210.

Figure 4:
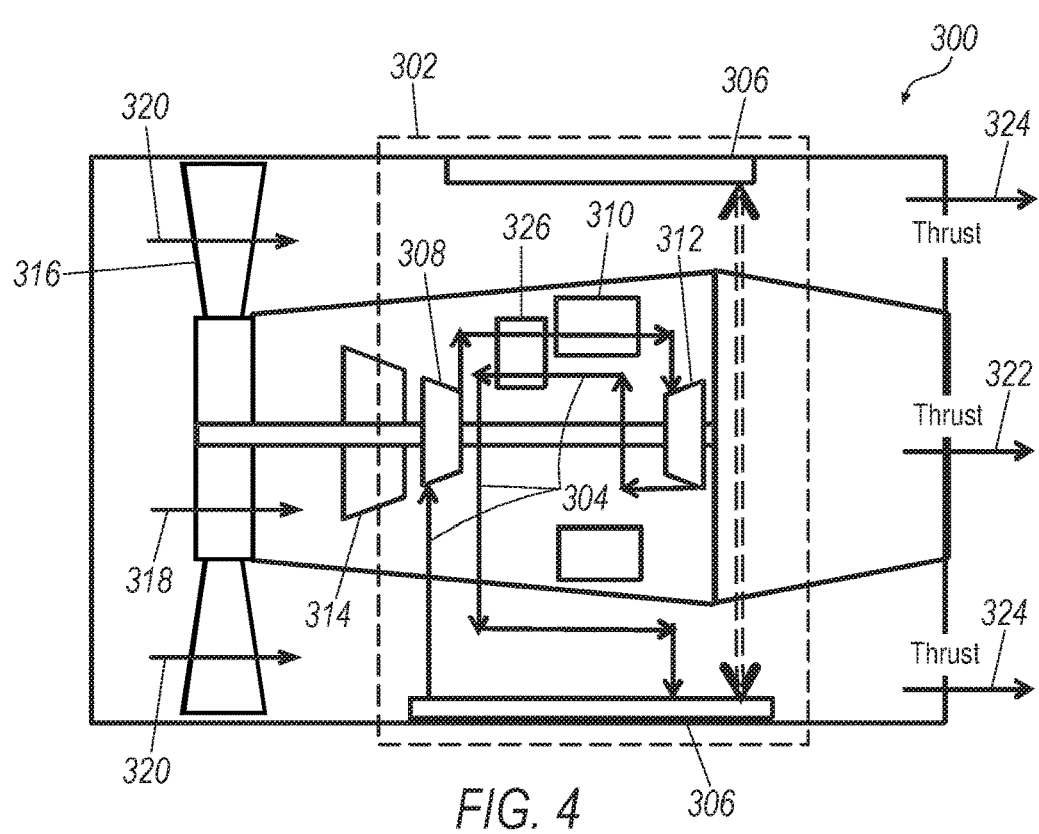
FIG. 4 is an illustration of an exemplary gas turbine engine that includes a recuperative heat exchanger for the working fluid, for example, utilized with a sectioned heat exchanger.

FIG. 4 is an illustration of a s-$CO_2$-based device or gas turbine engine 300 that includes a power circuit 302 in which lines 304 pass a working fluid in a closed circuit from a heat rejection heat exchanger 306, to a working fluid compressor 308, to a combustor 310, and to a working fluid turbine 312 for expansion and power extraction to the shaft. In this example, an air compressor 314 compresses air from a fan 316, which provides combustion air 318 and bypass air 320. As such, combustion air 318 passes from fan 316, to compressor 314, and to combustor 310, providing a thrust 322, while bypass air 320 passes to heat rejection heat exchanger 306, providing a thrust 324.

However, in this example, power circuit 302 includes a recuperative heat exchanger 326 through which lines 304 pass. Recuperative heat exchanger 326 receives the working fluid from compressor 308, and also from an outlet of turbine 312, improving overall thermodynamic efficiency of power circuit 302 by recuperating heat from the combustion process before rejecting the heat in heat rejection heat exchanger 306.

Figure 5:
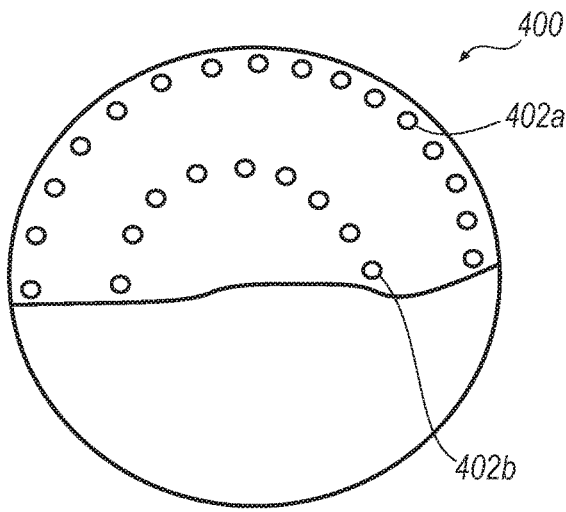
FIG. 5 is an illustration of a sectioned heat exchanger system of the present disclosure, for example, for a s-$CO_2$-based device or gas turbine engine.

FIG. 5 is an illustration of a sectioned heat exchanger system 400 may include one or more heat exchangers 402. For example, the system 400 may combine a heat rejection exchanger 402a and a heat absorption exchanger 402b. The sectioning of the system may be accomplished by a heat exchanger 402 that has plurality of sections. Each section may have at least one circuit with at least one passage or channel.

Each of those heat exchangers 402 may have one or plurality of channels positioned at equal or varying radial distances from the centerline. Each of those heat exchangers 402 has plurality of sections. Each section has a circuit having a passage or channel.

Each section may be independently operable to provide selective heat rejection and absorption. First heat exchanger 402a may include a heat rejection exchanger with circumferentially distributed channels at equal or varying radial distances from the centerline, e.g., utilized as heat exchangers 222, 306. Second heat exchanger 402b may include a heat absorption exchanger with circumferentially distributed channels at equal or varying radial distances from the centerline, e.g., a combustor heat exchanger utilized as combustors 116, 224, 310. Alternatively or in addition, heat exchanger 402 may include a recuperative heat exchanger, e.g., utilized as recuperative heat exchanger 326.

Thus, engine 400 may be configured to selectively utilize the sections to selectively isolate one or more circuits from the remaining sections in the event of leak thereby increasing engine reliability.

Allocation of heat exchanger channels may be different for hat absorption, heat rejection, and heat recuperation exchangers; however, the sectioning of heat exchangers provides plurality of sections, each section may have at least one circuit, and each circuit may have at least one passage or channel.

Figure 6:
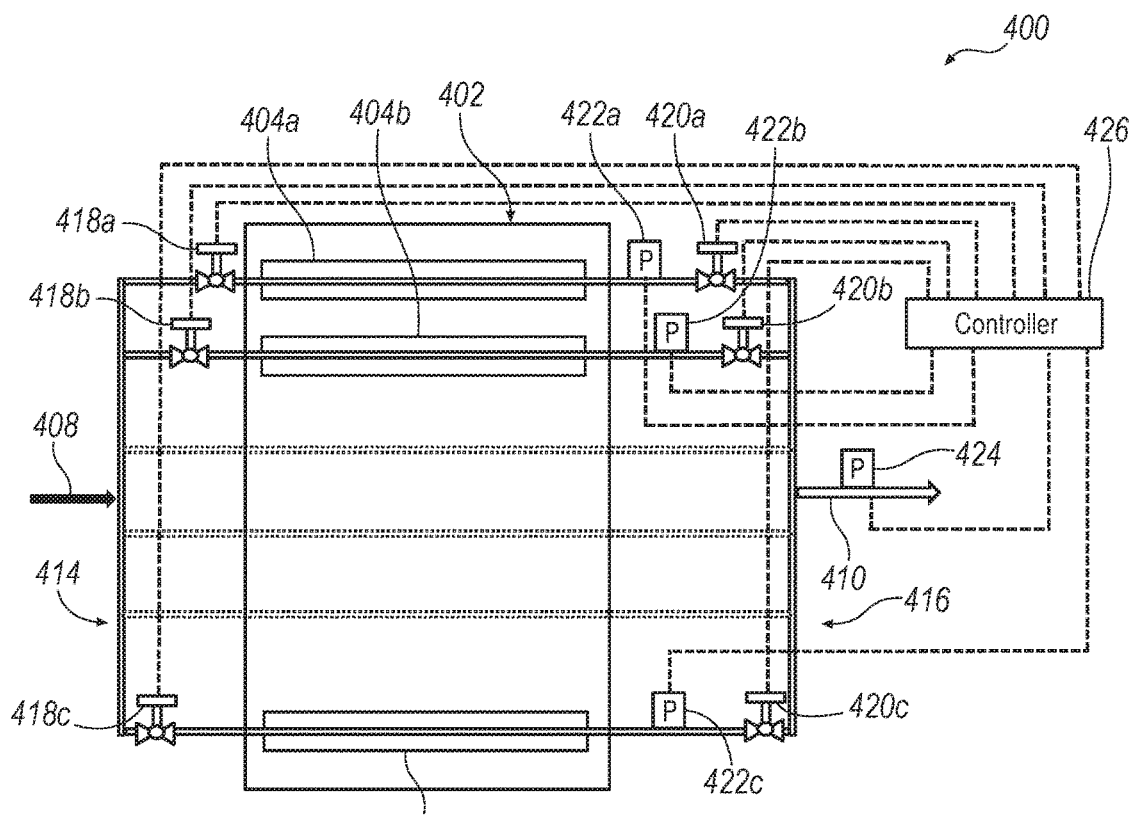
FIG. 6 is another illustration of a sectioned heat exchanger system of the present disclosure.

FIG. 6 is another illustration of sectioned heat exchanger system 400 with a heat exchanger 402 having a plurality of circuits 404a-c. An exemplary heat exchanger system 400 may be configured as a heat rejection exchanger, a heat absorption exchanger such as a combustor heat exchanger, a recuperative heat exchanger, or any combination thereof. The system 400 may include an inlet 408 configured to receive a working fluid and an outlet 410 configured to output the working fluid. Inlet 408 and outlet 410 may be respectively coupled to inlet and outlet manifolds 414, 416, which may be connected by the plurality of circuits 404a-c. Inlet manifold 414 may be configured to distribute the working fluid to a plurality of circuits 404 configured to transfer heat with respect to the working fluid. The outlet manifold 416 may be configured to pass the working fluid from the plurality of circuits 404 to the outlet 410. The heat exchanger system 400 may include a first sensor 422 configured to measure a first parameter such as a first pressure of a first circuit 404 and a second sensor 422/424 configured to measure a second parameter such as a second pressure of at least one of the outlet 410 and one or more second circuits 404. Inconsistent monitored pressures indicate existence of a formed leak. The heat exchanger system 400 may be configured to selectively isolate one or more of the circuits 404 from the remaining circuits 404 in response to a leak. Alternatively or in addition, any of the sensors 422/424 may include a mass flow rate sensor or a temperature sensor configured to measure, and the controller 426 may be configured to utilize, parameters such as mass flow rate or temperature.

Each of circuits 404 may include a circuit heat exchange channel configured to fluidly connect the inlet and outlet manifolds 414, 416. The circuit heat exchange channel of each circuit 404 may be configured to receive and exchange heat with the working fluid, e.g., by removing heat from or adding heat to the working fluid. Each of the circuits 404 may include a circuit inlet valve 418 and a circuit outlet valve 420, e.g., solenoid valves. Circuit inlet and outlet valves 418, 420 may be configured to be selectively opened and closed in response to controller 426.

One or plurality of circuits 404 carrying one fluid stream may be configured to be in thermal contact with one or plurality of circuits carrying the other fluid stream. All those circuits may form a section of, for example, a heat recuperation exchanger. If a leak occurs in the section, all circuits in the section will be isolated closing related valves such as solenoid valves.

The system 400 may include a controller 426. The controller 426 may be configured to selectively isolate one or more of the plurality of circuits 404 that are experiencing a leak from the remaining circuits 404. Each circuit 404 may include a sensor 422 configured to measure pressure in a circuit. The outlet 410 may include a sensor 424 configured to measure outlet pressure. The sensors 422, 424 may include one or more sensors such as pressure sensors. A first sensor 422 may be positioned near one or more first circuits 404. A second sensor 422/424 may be positioned near outlet 410 as shown, inlet 408, or a combination thereof or may be positioned near one or more second circuits 404b-c For example, the sensors 422/424 may include a pressure sensor that may be configured to measure pressure of the working fluid. The system 400 may include one or any combination of sensors 422, 424.

The controller 426 may be configured to detect at least one of a leak based on a pressure difference between the first sensor 422 and second sensor 422/424. The controller 426 may determine the pressure difference between the first pressure of a first circuit 404a and the second pressure of the outlet 410 or the second circuit 404b. The pressure difference may include a numerical difference or a ratio between the first and second parameters. The controller 426 may compare the pressure difference to a pressure threshold, e.g., predefined based on testing or startup operation of the engine. The controller 426 may be configured to close the circuit inlet valve 418 and circuit outlet valve 420 of at least one of the circuits in response to the parameter difference reaching the predefined threshold, e.g., indicating leak of the one or more of the circuits 404. Alternatively or in addition, the controller 426 is configured to close the circuit inlet valve 418 and the outlet valve 420 of at least one of the circuits 404 based on at least one of a cruise operation and a predefined power demand of the engine. Thus, based on the operation of the sectioned heat exchanger system or the operations of or demands on the engine, controller 426 may selectively close one or more circuits 404 that are experiencing a leak, thereby increasing the engine reliability by isolating the circuits 404 that are experiencing the leak.

For example, the controller 426 may utilize the first sensor 422 to measure a first pressure in the first circuit 404a and the second sensor 424 of the outlet 410 to measure a second pressure. If the pressure of the first circuit 404a is not aligned with the outlet 410, controller 426 may detect a leak in circuit 404a and close circuit 404a, thereby isolating circuit 404a from the flow of the working fluid to circuits 404b-c. Thus, the controller 426 may selectively isolate one or more circuits 404a from the flow of working fluid to the remaining circuits 404b-c based a parameter difference between the first and second parameters.

As another example, the controller 426 may utilize the first sensor 422 to measure pressure in the first circuit 404a and the second sensor 422 of the second circuits 404b-c to measure pressure. If the pressure of the first circuit 404a is not aligned with the second circuits 404b-c, controller 426 may detect a leak in circuit 404a and close circuit 404a, thereby isolating circuit 404a from the flow of the working fluid to circuits 404b-c. Thus, the controller 426 may selectively isolate one or more of the circuits 404 from the flow of working fluid to the remaining circuits 404 based a pressure difference between the first and second parameters.

Sectioning heat exchangers allows the system to detect leak and prevent loss of refrigerant charge in s-CO2 engines. This significantly improves reliability of s-CO2 engines.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A sectioned heat exchanger system for a gas turbine engine, comprising:
   an inlet manifold configured to receive a working fluid;
   a plurality of circuits including at least first and second circuits configured to transfer heat with respect to the working fluid, each of the first and second circuits having a circuit inlet valve, a circuit heat exchange channel, and a circuit outlet valve;
an outlet manifold configured to pass the working fluid to an outlet;
a first sensor configured to measure a first parameter of the first circuit;
a second sensor configured to measure a second parameter of at least one of the outlet and the second circuit; and
a controller of the gas turbine engine and configured to selectively isolate at least one of the plurality of circuits by closing at least one of the first and second circuits in response to detecting a leak based on a parameter difference between the first and second parameters.

2. The system of claim 1, wherein the first and second sensors include respective first and second pressure sensors, wherein the parameter difference includes a pressure difference.

3. The system of claim 1, wherein the controller is configured to detect the leak based on the parameter difference including a ratio between the first and second parameters.

4. The system of claim 1, wherein the controller is configured to close the circuit inlet and outlet valves of at least one of the circuits in response to the parameter difference reaching a predefined threshold.

5. The system of claim 1, further comprising a mass flow rate sensor configured to measure the mass flow rate of the working fluid, wherein the controller is configured to close the circuit inlet and outlet valves of at least one of the circuits based on the mass flow rate.

6. The system of claim 1, wherein the controller is configured to close the circuit inlet and outlet valves of at least one of the circuits based on at least one of a cruise operation and a power demand indicated by the controller.

7. The system claim 1, wherein the working fluid is carbon dioxide.

8. A method of operating a sectioned heat exchanger system of a gas turbine engine, comprising:
receiving a working fluid with an inlet manifold;
distributing the working fluid to a plurality of circuits including at least first and second circuits configured to transfer heat with respect to the working fluid, each of the first and second circuits having a circuit heat exchange channel;
passing the working fluid through an outlet manifold and to an outlet;
measuring a first parameter of the first circuit with a first sensor;
measuring a second parameter of at least one of the outlet and the second circuit with a second sensor;
selectively isolating at least one of the plurality of circuits with a controller of the gas turbine engine and by closing at least one of the first and second circuits in response to detecting a leak based on a parameter difference between the first and second parameters.

9. The method of claim 8, wherein the first and second sensors include respective first and second pressure sensors, wherein the parameter difference includes a pressure difference.

10. The method of claim 8, further comprising detecting the leak based on the parameter difference including a ratio between the first and second parameters.

11. The method of claim 8, further comprising closing a circuit inlet valve and a circuit outlet valve of at least one of the circuits in response to the parameter difference reaching a predefined threshold.

12. The method of claim 8, wherein the controller is configured to close a circuit inlet valve and a circuit outlet valve of at least one of the circuits based on a mass flow rate of the working fluid.

13. The method of claim 8, wherein the controller is configured to close the circuit inlet and outlet valves of at least one of the circuits based on at least one of a power demand and a cruise operation indicated by the controller.

14. A system of a gas turbine engine, comprising:
a compressor;
a turbine;
a sectioned heat exchanger fluidly interposing the compressor and turbine, the sectioned heat exchanger including:
an inlet manifold configured to receive a working fluid;
a plurality of circuits including at least first and second circuits configured to transfer heat with respect to the working fluid, each of the first and second circuits having a circuit inlet valve, a circuit heat exchange channel, and a circuit outlet valve;
an outlet manifold configured to pass the working fluid to an outlet;
a first sensor configured to measure a first parameter of the first circuit;
a second sensor configured to measure a second parameter of at least one of the outlet and the second circuit; and
a controller of the gas turbine engine and configured to selectively isolate at least one of the plurality of circuits by closing at least one of the first and second circuits in response to detecting a leak based on a parameter difference between the first and second parameters.

15. The system of claim 14, wherein the first and second sensors include respective first and second pressure sensors.

16. The system of claim 14, wherein the controller is configured to detect the leak based on a parameter difference including a ratio between the first and second parameters.

17. The system of claim 14, wherein the controller is configured to close the circuit inlet and outlet valves of at least one of the circuits in response to the parameter difference reaching a predefined threshold.

18. The system of claim 14, further comprising a mass flow rate sensor configured to measure the mass flow rate of the working fluid, wherein the controller is configured to close the circuit inlet and outlet valves of at least one of the circuits based on the mass flow rate.

19. The system of claim 14, wherein the controller is configured to close the circuit inlet and outlet valves of at least one of the circuits based on at least one of a cruise operation and a power demand indicated by the controller.

20. The system claim 14, wherein the working fluid is carbon dioxide.

* * * * *